United States Patent
Kawaguchi et al.

[11] Patent Number: 6,142,445
[45] Date of Patent: Nov. 7, 2000

[54] ELECTROMAGNETIC CONTROL VALVE

[75] Inventors: Masahiro Kawaguchi; Ken Suitou; Hiroyuki Nagai; Masanori Sonobe, all of Aichi; Tomoo Okada, Saitama; Ichiro Ohkawara, Saitama; Tadaaki Ikeda, Saitama, all of Japan

[73] Assignees: Kabushiki Kaisha Toyoda Jidoshokki Seisakusho, Aichi; Kabushiki Kaisha Saginomiya Seisakusho, Tokyo, both of Japan

[21] Appl. No.: 09/070,814

[22] Filed: May 1, 1998

[30] Foreign Application Priority Data

May 20, 1997 [JP] Japan ................................. 9-129912

[51] Int. Cl.[7] ................................................. F16K 31/02
[52] U.S. Cl. ........................................ 251/129.15; 251/323
[58] Field of Search ................................ 251/324, 129.15, 251/323

[56] References Cited

U.S. PATENT DOCUMENTS

| | | | |
|---|---|---|---|
| 5,050,840 | 9/1991 | Kondo et al. | 251/129.15 |
| 5,160,116 | 11/1992 | Sugiura et al. | 251/129.15 |
| 5,261,637 | 11/1993 | Curnow | 251/129.15 |
| 5,588,590 | 12/1996 | Sakakibara et al. | 137/614 |
| 5,752,689 | 5/1998 | Barkhimer et al. | 251/129.15 |
| 5,856,771 | 1/1999 | Nippert | 251/129.15 |
| 5,890,876 | 4/1999 | Suito et al. | 251/129.02 |

FOREIGN PATENT DOCUMENTS 9-296876  11/1997  Japan .

Primary Examiner—Kevin Shaver
Assistant Examiner—Eric Keasel
Attorney, Agent, or Firm—McDermott Will & Emery

[57] ABSTRACT

An electromagnetic control valve is provided. The control stability of the electromagnetic control valve is improved because: (1) one end of the guide pin is forced into and then secured in a hole formed in the center of the coil guide so that the plunger moves in the center of the suction portion; (2) one end of the connecting rod is forced into and then secured in a hole formed in the center of the plunger, and a guide portion for guiding the connecting rod is provided in the center of the upper main body; or (3) the connecting rod is forced into and then secured in a hole formed in the center of the plunger, and a first guide portion for guiding the connecting rod is provided at the lower end of the coil guide and/or a second guide portion for guiding the connecting rod is provided at the lower end of the upper main body.

17 Claims, 5 Drawing Sheets

ELECTROMAGNETIC CONTROL VALVE

BACKGROUND OF THE INVENTION

1. Field of the Invention

The present invention relates to an electromagnetic control valve for a variable capacity compressor and, more particularly, to an electromagnetic control valve for a variable capacity compressor employed in a cooling unit for vehicles.

2. Related Art

The inventors of the present invention have developed an electromagnetic control valve for a variable capacity compressor employed in a cooling unit for vehicles, which is disclosed in Japanese Patent Application No. 8-109797.

FIG. 4 is a schematic view of a capacity control mechanism in a variable capacity compressor in which the above electromagnetic control valve is employed.

A compressor 20 is provided with an electromagnetic control valve 1-5 for capacity control at its attachment cavity portion 40. A plurality of cylinders 25 are provided inside the head portion leading to the crankcase 21 of the compressor 20. A piston 26 is slidably provided for each of the cylinders 25. A driving shaft 27 is rotatably provided between the crankcase 21 and the head portion 41. The driving shaft 27 is driven by an engine (not shown) with assistance of a belt 35 and a pulley 34 provided at the outer end.

The driving shaft 27 is provided with a known wobble plate 29 for angle variation. The wobble plate 29 is connected to the pistons 26 via piston rods 24. The inclined wobble plate 29 is rotated by the driving shaft 27 to reciprocate the piston rods 24 and the pistons 26. Thus, the attachment angle of the wobble plate 29 can be automatically adjusted depending on the difference between the control chamber pressure Pc inside the crankcase 21 and the suction side pressure Ps inside the cylinders 25. Accordingly, the stroke width of the pistons can be varied depending on the inclination of the wobble plate 29.

Each of the cylinders 25 has a suction inlet S and a discharge outlet D, and is connected, via passages d and s, to a condenser 31, an evaporator 32, and an expansion valve 33, which constitute the refrigerating cycle. The electromagnetic control valve 1-5 is led to a control chamber C inside the crankcase 21 via a refrigerant passage 36, to the suction inlet S via a refrigerant passage 37, and to the discharge outlet D via a refrigerant passage 38.

FIG. 5 is a sectional view of the electromagnetic control valve of the prior art when not energized.

The electromagnetic control valve 1-5 includes: (a) a valve member 8a which is provided in a valve chamber 18 formed by an upper main body 7 and a valve main body 17, and which repeatedly comes into contact with and depart from a valve seat 17d formed in a valve opening 17k situated on the way to a Pc pressure introducing opening 17h leading to the crank chamber C in the crankcase 21; (b) a Pd pressure introducing opening 17i which is formed on the opposite side of the Pc pressure introducing opening 17h from the valve chamber 18, and which leads to the discharge-side refrigerant passage 38 of the compressor 20; (c) a valve guide 17e extending from the Pd pressure introducing opening 17i to the Pc pressure introducing opening 17h; (d) a valve stem 8b which is integrally formed with the valve member 8a, and which is movable in the vertical direction inside the valve guide 17e; (e) a pushing unit 9 for pushing the valve member 8a in the valve opening direction; (f) a plunger 5 situated above the upper main body 7 which is vertically movable by virtue of the suction power of an electromagnetic coil 15, and which pushes the valve member 8a in the valve closing direction via a connecting rod 6 which is vertically movable in a through opening 7b of the upper main body 7; (g) a pressure equalizing opening 17q formed through the valve main body 17 and extending from the valve chamber 18 to the Pd pressure introducing opening 17i; (h) pressure bellows 11 formed below the Pd pressure introducing opening 17i and situated in a space 17g which communicates with the suction inlet S of the compressor 20; and (i) a corrective pin 10 which comes into point-contact with the lower surface of the valve stem 8 at its upper end and with the pressure bellows 11 at its lower end, and which is movable in a guide hole 17j extending from the Pd pressure introducing opening 17i to the space 17g.

With the suction pressure Ps of the piston cylinders 25 in FIG. 5, the pressure bellows 11 control the opening of the valve amber 8a, which is situated in the refrigerant passage extending from the refrigerant passage (a discharge pressure supply passage) 38 to the crankcase 21.

A casing 2, a coil guide 3, the plunger 5, the connecting rod 6, the upper main body 7, the electromagnetic coil 15, and a plunger tube 16, integrally constitute an electromagnetic actuator. The closing of the valve member is controlled depending on the current supplied to the electromagnetic coil by the electromagnetic actuator.

With the above electromagnetic control valve, however, there has been a problem that the control stability is often lowered. The contact surfaces between the plunger and the upper main body are a conic surface having uniform vertical angles and a plane vertical to the valve stem, respectively. If the plunger deviates from the center of the suction portion of the upper main body, the horizontal suction force toward the conic surface suction portion is great in the case where the plunger is situated close to the upper main body, and small in the case where the plunger is far from the upper main body. Because of the unbalance of the suction force, the plunger deviates further from the center, and is pressed by the plunger tube due to the horizontal suction force when moving. The friction resistance caused here appears as hysteresis, which lowers the control stability of the valve.

Since the magnetic force loss is great between the plunger and the coil guide, it has been necessary to use a coil large enough to obtain the coil suction force required.

SUMMARY OF THE INVENTION

The principal object of the present invention is to improve the control stability of an electromagnetic valve by reducing the hysteresis in the electromagnetic actuator and also reducing magnetic force loss.

A first aspect of the present invention is to provide an electromagnetic control valve having a plunger movable by electromagnetic force of the electromagnetic coil. The plunger adjusts the opening of the valve body of this electromagnetic control valve. One end of the guide pin is forced into and then secured in a hole formed in the center of the coil guide so that the plunger moves in the center of the suction portion. A guide hole is formed in the center of the plunger so that the plunger moves along the guide pin.

In a second aspect of the present invention, an electromagnetic control valve is provided with a plunger movable by electromagnetic force of the electromagnetic coil, and the movements of the plunger are transferred to the valve member via the connecting rod so as to adjust the opening of the valve member. One end of the connecting rod is forced into and then secured in a hole formed in the center of the plunger so that the plunger moves in the center of the suction portion. A guide portion for guiding the connecting rod is provided in the center of the upper main body.

In a third aspect of the present invention, an electromagnetic control valve is provided with a plunger movable by electromagnetic force of the electromagnetic coil, and the movements of the plunger are transferred to the valve member via the connecting rod, thereby adjusting the opening of the valve member. The connecting rod is forced into and then secured in a hole formed in the center of the plunger so that the plunger moves in the center of the suction portion. A first guide portion for guiding the connecting rod is provided at the lower end of the coil guide.

In a fourth aspect of the present invention, a second guide portion having low frictional resistance for guiding the connecting rod is provided at the lower end of the upper main body of the electromagnetic control valve.

In a fifth aspect of the present invention, a coil cover made of a magnetic material is provided inside the electromagnetic coil so that the upper end of the coil cover is in contact with the casing while the lower end surrounds the plunger.

The above and other objects and features of the present invention will be more apparent from the following description taken in conjunction with the accompanying drawings.

DETAILED DESCRIPTION OF THE PREFERRED EMBODIMENTS

The following is a description of embodiments of the present invention, with reference to the accompanying drawings.

(First Embodiment)

Figure 1:
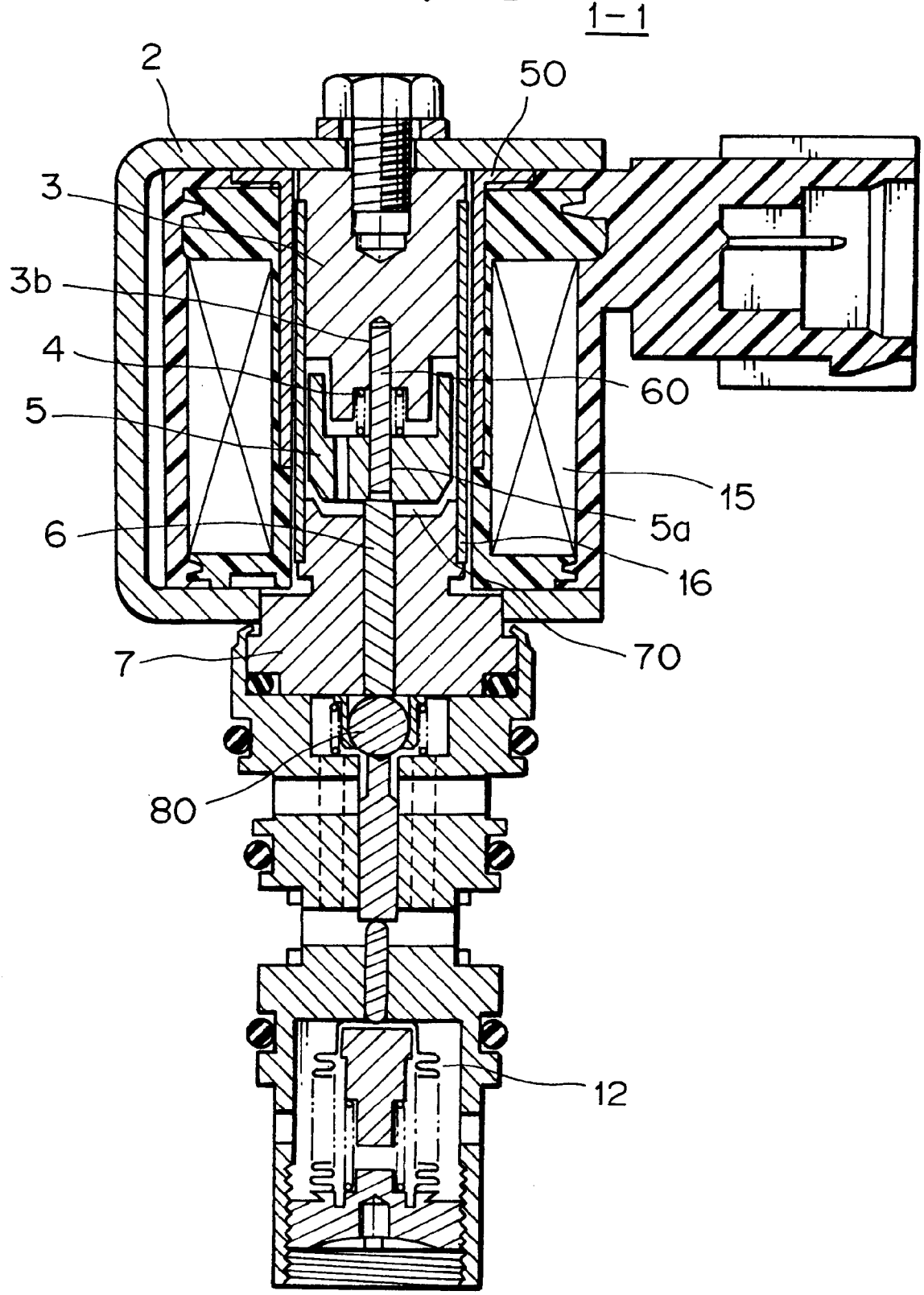
FIG. 1 is a sectional view of a first embodiment of an electromagnetic control valve in accordance with the present invention.
Figure 4:
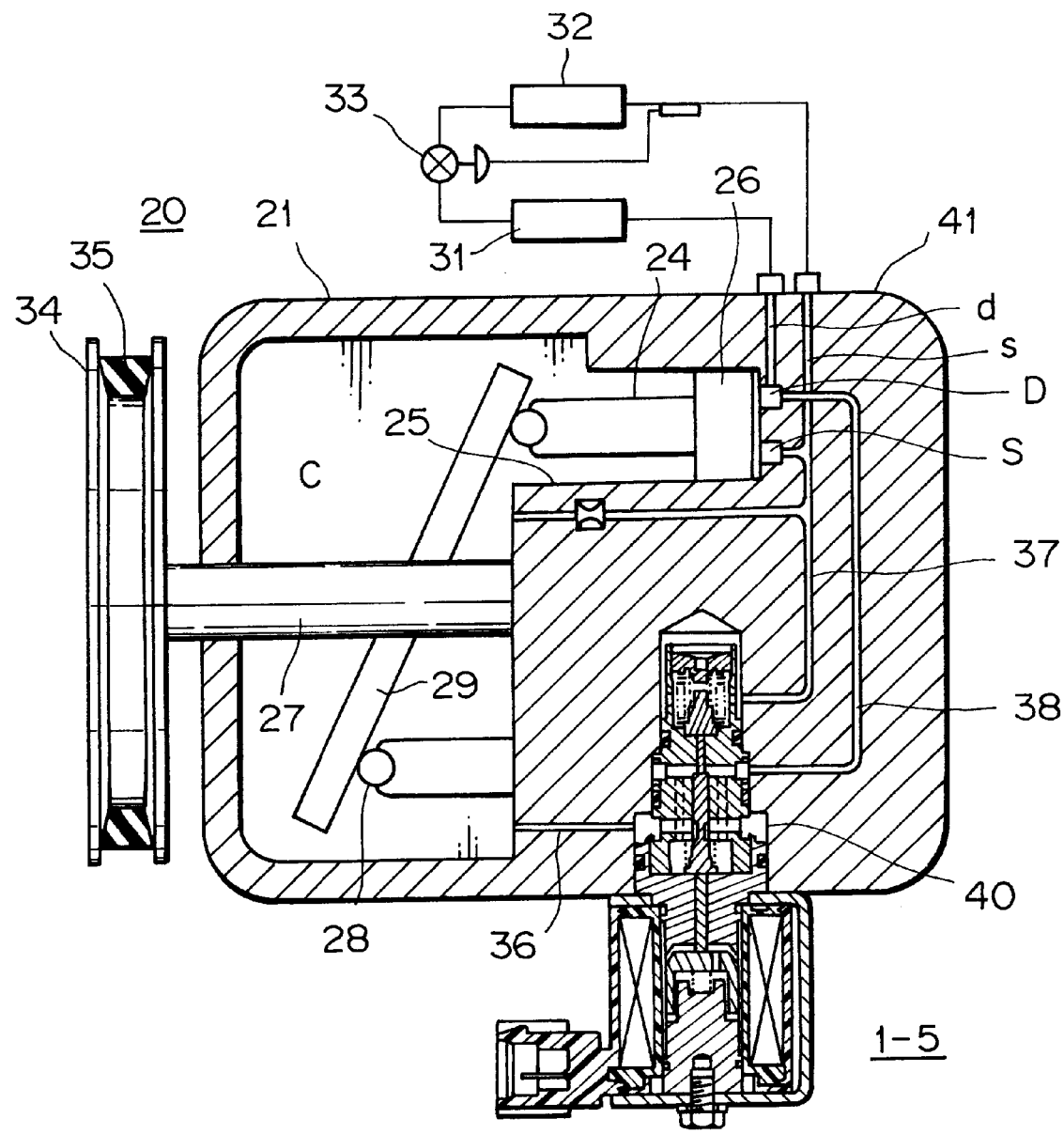
FIG. 4 is a schematic view of a capacity control mechanism in a variable capacity compressor in which a conventional electromagnetic control valve is employed.
Figure 5:
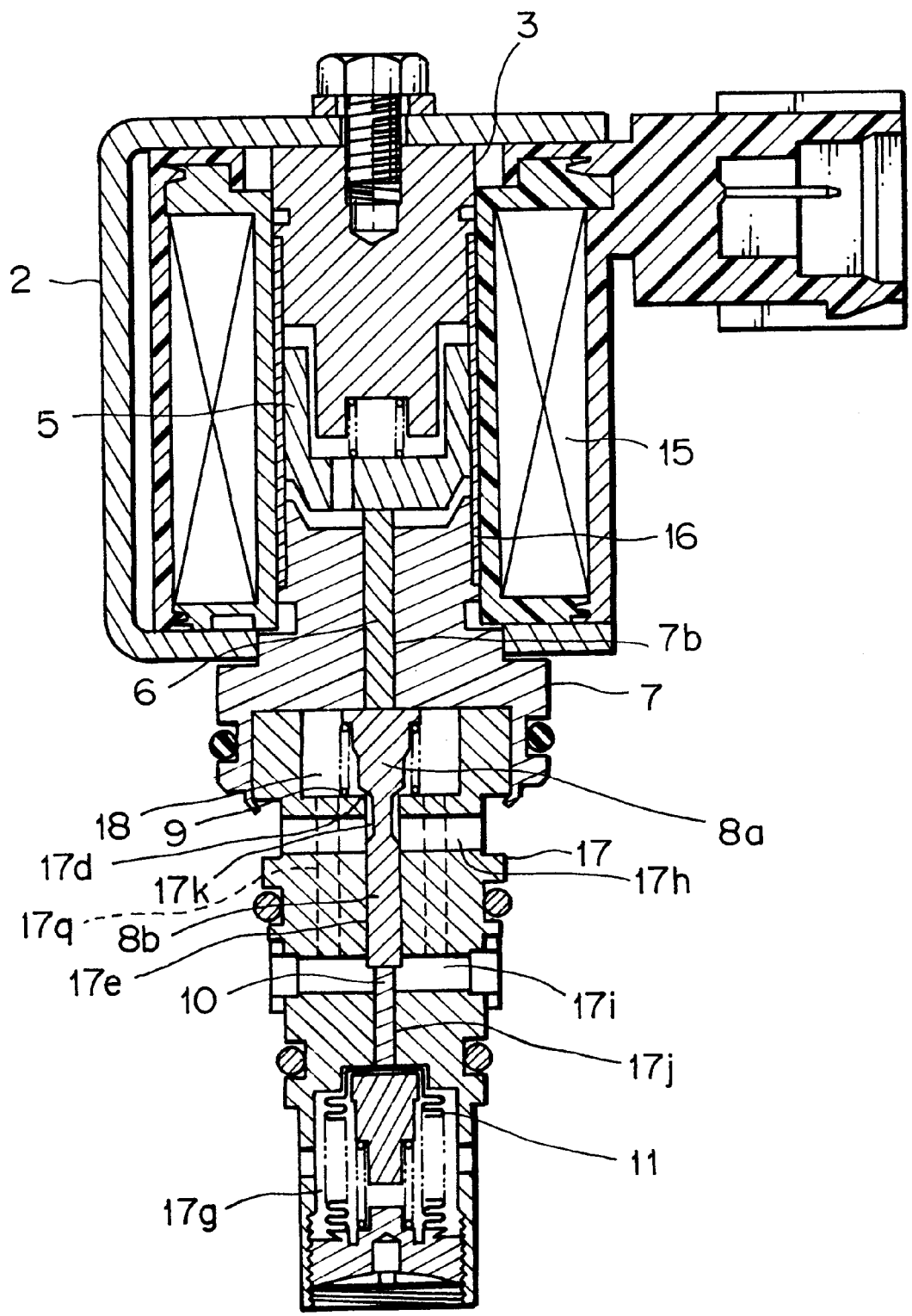
FIG. 5 is a sectional view illustrating the conventional electromagnetic control valve when not energized.

FIG. 4 shows a capacity control mechanism in a variable capacity compressor in which an electromagnetic control valve is employed. FIG. 1 shows an electromagnetic valve 1-1 attached to such capacity control mechanism as shown in FIG. 4.

This electromagnetic control valve 1-1 comprises bellows 12 for controlling the opening of a valve member 80 by suction pressure Ps of a piston cylinder 25, and an electromagnetic actuator for controlling the opening of the valve member 80 by electric current supplied to the electromagnetic coil. The bellows 12 are provided in a discharge pressure supply path 38 leading to the inside of a crankcase 21 from the discharging side of a compressor 20. The electromagnetic actuator is made up of a casing 2, a coil guide 3, a plunger 5, a connecting rod 6, an upper main body 7, an electromagnetic coil 15, and a plunger tube 16.

One end of a guide pin 60 is forced into and then secured in a hole 3b formed in the center of the coil guide 3 so that the plunger 5 moves in the center of a suction portion 70 while keeping clearance with the plunger tube 16. A guide hole 5a is formed in the center of the plunger 5 so that the plunger 5 moves along the guide pin 60. A clearance of 0.2 mm or so is formed between the plunger 5 and the plunger tube 16 so that they never come into contact with each other. This aspect of the embodiment is the same as in other embodiments.

Since one end of the guide pin 60 is secured by the hole 3b formed in the center of the coil guide 3, the plunger 5 is guided along the guide pin by virtue of the guide hole 5a. Thus, the plunger 5 moves in the center of the suction portion 70 without coming into contact with the plunger tube 16.

(Second Embodiment)

Figure 2:
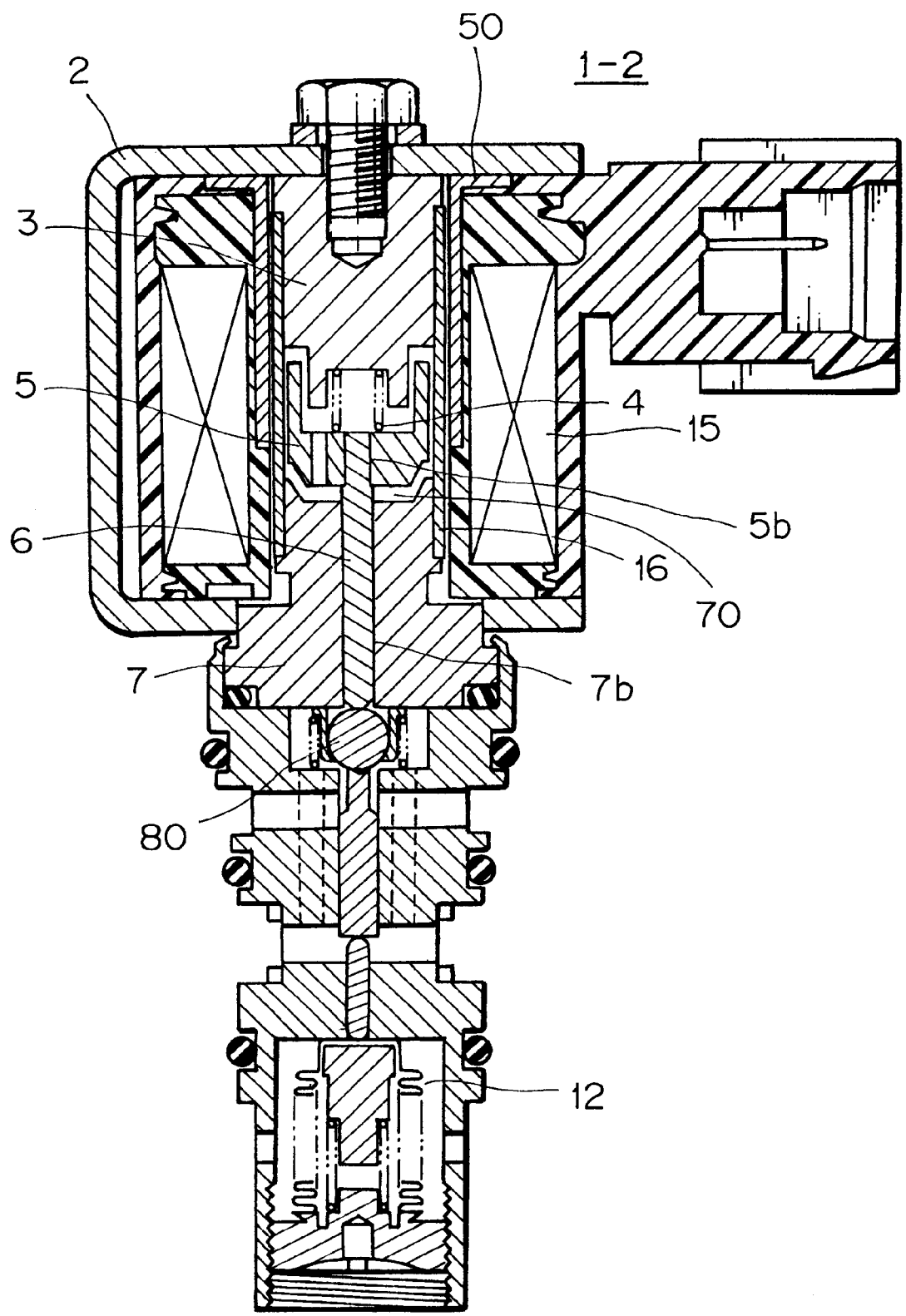
FIG. 2 is a sectional view of a second embodiment of an electromagnetic valve in accordance with the present invention.

FIG. 2 shows an electromagnetic control valve 1-2 attached to the above-mentioned capacity control mechanism.

This electromagnetic control valve 1-2 is provided with the same bellows 12 and electromagnetic actuator as in the first embodiment. One end of the connecting rod 6 is forced into and then secured in a hole 5b formed in the center of the plunger 5 so that the plunger 5 moves in the center of the suction portion 70 while keeping clearance with the plunger tube 16. The plunger 5 is secured to the one end of the connecting rod 6 by virtue of the hole 5b, and guided by the guide hole 7b formed in the center of the upper main body 7 via the connecting rod 6.

(Third Embodiment)

Figure 3:
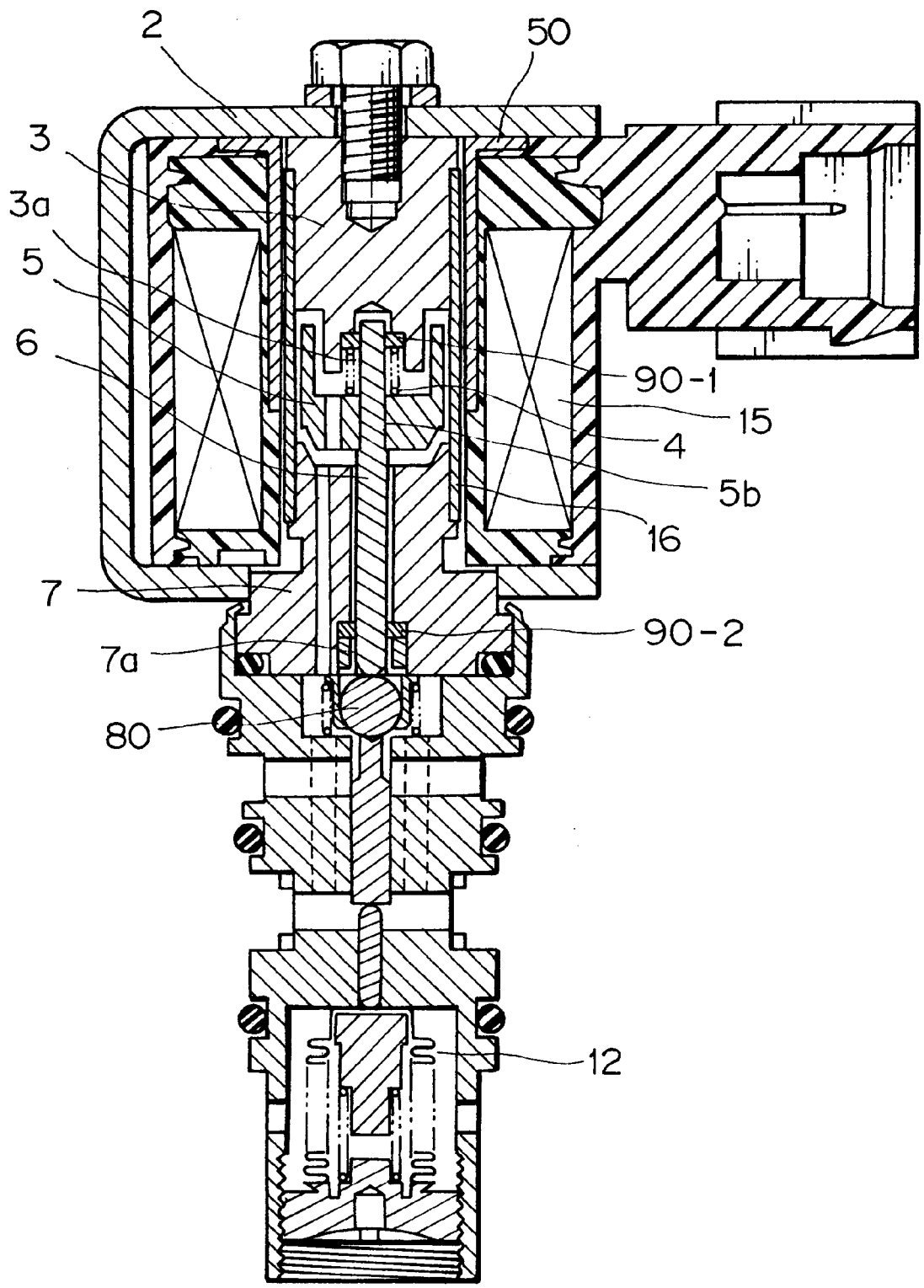
FIG. 3 is a sectional view of third and fourth embodiments of an electromagnetic valve in accordance with the present invention.

FIG. 3 shows an electromagnetic control valve 1-3 attached to the above-mentioned capacity control mechanism.

This electromagnetic control valve 1-3 is provided with the same bellows 12 and electromagnetic actuator as in the first embodiment. One end of the connecting rod 6 is forced into and secured in the hole 5b formed in the center of the plunger 5 so that the plunger moves in the center of the suction portion while keeping clearance with the plunger tube 16. A first guide portion 90-1 made of polytetrafluoroethylene (i,e TEFLON®) having low frictional resistance is provided at the lower end of the coil guide 3, and a second guide portion 90-2 made of polytetrafluoroethylene having low frictional resistance is provided at the lower end of the upper main body 7.

The plunger 5 is secured to the connecting rod 6 by virtue of the hole 5b, and guided by the first guide portion 90-1 and the second guide portion 90-2 via the connecting rod 6.

As the plunger 5 moves along the guide portions 90-1 and 90-2, unbalance of horizontal suction force caused at the conic suction portion can be reduced. Furthermore, there is no friction resistance caused between the plunger 5 and the plunger tube 16, because they do not come into contact with each other. Since vertical frictional resistance caused at the connecting rod can be reduced by virtue of the guide portion made of polytetrafluoroethylene, the hysteresis in the electromagnetic actuator can be about four times smaller than in the prior art.

(Fourth Embodiment)

An electromagnetic control valve of the fourth embodiment is the same as in the first to third embodiments, except that a coil cover 50 made of a magnetic material is provided inside the electromagnetic coil 15 so that the upper end of it is in contact with the casing 2 while the lower end is positioned around the plunger 5.

Since magnetic force is transferred between the coil cover 50 and the plunger 5, magnetic force loss can be reduced and coil suction force can be twice greater than in the case where no coil cover is used. Thus, the electromagnetic coil can be made smaller accordingly.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A plunger-type electromagnetic control valve comprising:
    a plunger reciprocatively disposed in the control valve in a predetermined operative disposition within a solenoid coil structure;
    a valve element;
    a first spring arranged with the plunger for applying a first bias thereto;
    a second spring arranged with the valve element for applying a second bias thereto;
    a connecting rod operatively interconnecting the plunger and the valve element; and
    a guide arrangement for guiding the plunger in a spaced, contact-free, sliding-friction reducing relationship with respect to the solenoid coil structure;
    wherein the connecting rod extends through the plunger and wherein the alignment arrangement comprises first and second guide portions which are made of a low friction material and are arranged to support the connecting rod on either side of the plunger, the first spring being disposed between the first guide portion and the plunger.

2. A plunger-type electromagnetic control valve as set forth in claim 1, wherein the plunger has a vent port therein.

3. A plunger-type electromagnetic control valve as set forth in claim 1, wherein the valve element is a spherical valve element and wherein the second spring is arranged to apply a bias to the spherical valve element through a cage in which the valve element is disposed.

4. A plunger-type electromagnetic control valve as set forth in claim 1, wherein the plunger is cup-shaped so as to have an upstanding peripheral wall portion which surrounds the first spring.

5. A plunger-type electromagnetic control valve comprising:
    a plunger for controlling movement of a valve member reciprocatively driven within a fixed upper main body by an electromagnetic coil;
    an alignment unit for guiding the plunger along a center axis of the fixed upper main body, said alignment unit comprising:
        a guide hole which extends coaxially through a center of the plunger, and
        a guide pin having one end immovably secured in a hole formed in a stationary member of the control valve, said guide pin being disposed in the guide hole so that said plunger can reciprocate therealong while being maintained in a spaced, contact free relationship with a member which surrounds the periphery of said plunger, and so that one end of the plunger directly engages a first end of a connecting rod which is reciprocatively disposed in the electromagnetic control valve.

6. A plunger-type electromagnetic control valve comprising:
    a plunger reciprocatively disposed in the control valve in a predetermined operative disposition within a solenoid coil structure;
    a valve element;
    a first spring arranged with the plunger for applying a first bias thereto;
    a second spring arranged with the valve element for applying a second bias thereto;
    a connecting rod operatively interconnecting the plunger and the valve element; and
    a guide arrangement for guiding the plunger in a spaced, contact-free, sliding-friction reducing relationship with respect to the solenoid coil structure;
    wherein the guide arrangement comprises a guide pin which is rigidly set in a stationary structure of the control valve and an axial bore formed in the plunger in which the guide pin is received.

7. A plunger-type electromagnetic control valve as set forth in claim 6, wherein the first spring surrounds part of the guide pin.

8. A plunger-type electromagnetic control valve as set forth in claim 6, wherein the connecting rod abuts an end surface of the plunger and is coaxially aligned with the guide pin.

9. A plunger-type electromagnetic control valve comprising:
    a plunger for controlling movement of a valve member reciprocatively driven within a fixed upper main body by an electromagnetic coil;
    an alignment unit for guiding the plunger along a center axis of the fixed upper main body so that an outer peripheral surface of the plunger is maintained in a contact free relationship with surrounding control valve structure, said alignment unit comprising:
        a guide hole which extends coaxially through a center of the plunger, and
        a guide pin having one end immovably secured in a pin receiving hole formed in a stationary member of the control valve.

10. The plunger-type electromagnetic control valve according to claim 9, wherein:
    the contact surfaces between the plunger and the fixed upper main body are conic surfaces having a uniform vertical angle and a plane perpendicular to the center axis of the plunger.

11. The plunger-type electromagnetic control valve according to claim 9, wherein:
    said guide hole of the alignment unit is formed along the coaxial the center of the plunger.

12. The plunger-type electromagnetic control valve according to claim 9, wherein:
    the member in which an end of the guide pin is secured, is a coil guide and wherein another end of the guide pin is received in said guide hole formed in a center of the plunger.

13. The plunger-type electromagnetic control valve according to claim 9, wherein:
    the alignment unit is formed by securing one end of a connecting rod in a rod receiving hole formed at the center of the plunger, and by engaging the connecting rod with a second guide hole formed in the center of the fixed upper main body.

14. The plunger-type electromagnetic control valve according to claim 9, wherein:
    the alignment unit is formed by securing one part of a connecting rod in a rod receiving hole formed at the center of the plunger, and by engaging one end portion of the connecting rod with a guide portion having a low frictional resistance disposed in a concave portion at the center of a coil guide.

15. The plunger-type electromagnetic control valve according to claim 14, wherein:

the other end portion of the connecting rod is engaged with a second guide portion having a low frictional resistance disposed in a concave portion at the center and lower end of the fixed upper main body.

16. The plunger-type electromagnetic control valve according to claim 9, further comprising:

a coil cover disposed within the electromagnetic coil, the coil cover being made of a magnetic material and arranged so that an upper end portion is in contact with an outer casing and the lower end portion is positioned to surround the plunger.

17. The plunger-type electromagnetic control valve according to claim 9, further comprising:

a first spring disposed between the plunger and a stationary member of the control valve;

a second spring disposed with a valve element; and a connecting rod operatively connecting the valve element and the plunger so that displacement of the plunger displaces the valve element.

* * * * *